March 24, 1925. 1,530,694
H. C. PRIEBE
DRAFT GEAR
Filed Dec. 24, 1921  2 Sheets-Sheet 2
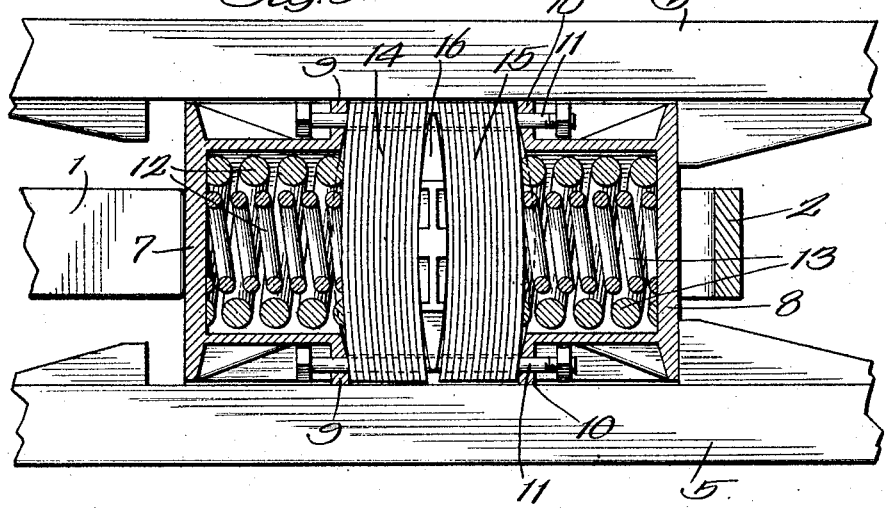
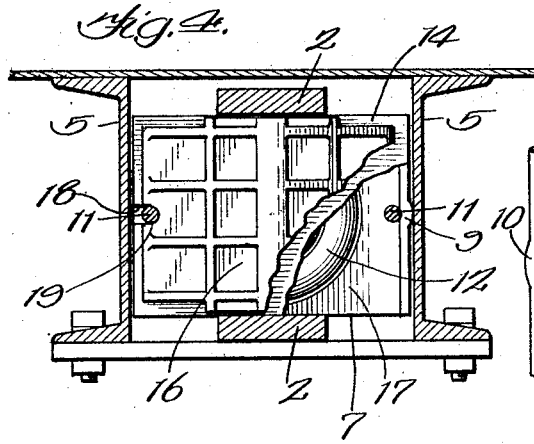
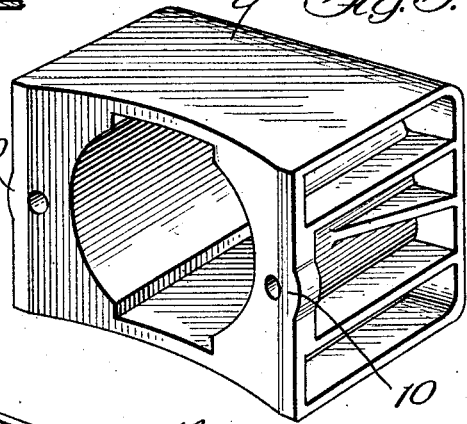
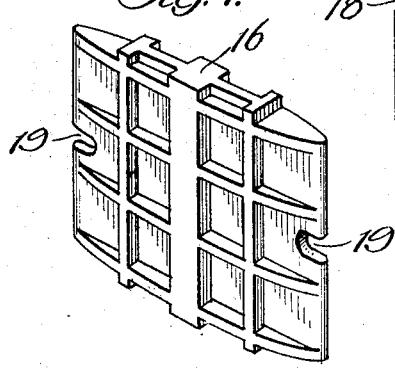
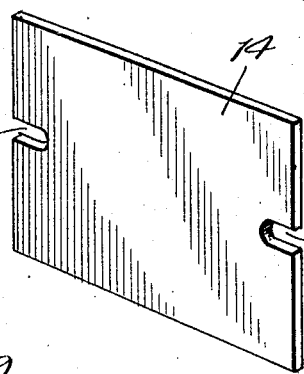
Inventor:
Herman C. Priebe Patented Mar. 24, 1925.

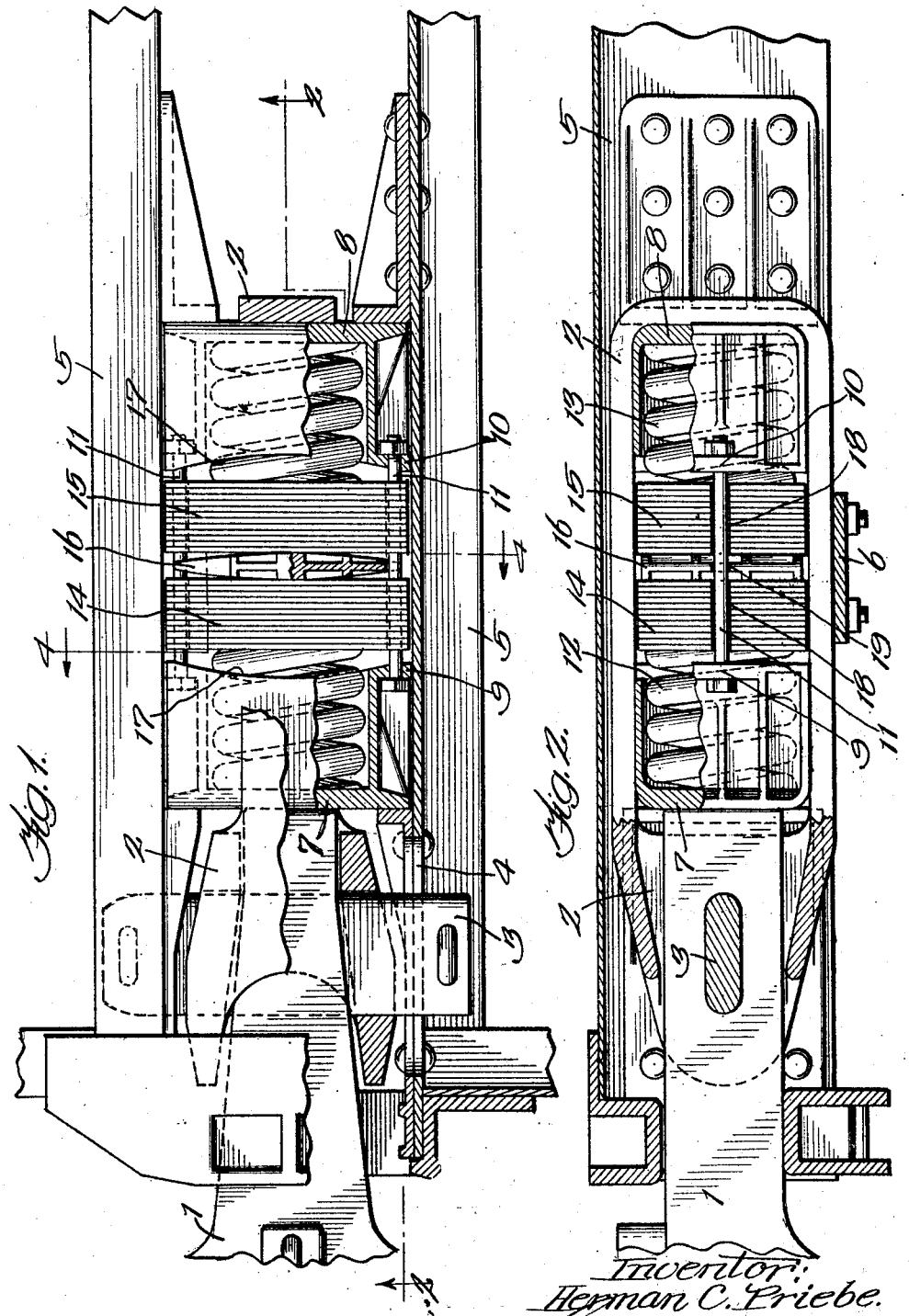

1,530,694

UNITED STATES PATENT OFFICE.

HERMAN C. PRIEBE, OF BLUE ISLAND, ILLINOIS.

DRAFT GEAR.

Application filed December 24, 1921. Serial No. 524,680.

*To all whom it may concern:*

Be it known that I, HERMAN C. PRIEBE, citizen of the United States, residing at Blue Island, in the county of Cook and State of Illinois, have invented a certain new and useful Improvement in Draft Gears, of which the following is a full, clear, concise, and exact description.

My invention relates to draft gears for coupling railway cars into trains and in particular to that class of gears which employ motion resisting or shock absorbing elements at the inner and outer ends of coupler yokes and which are arranged to interact in opposing violent coupler blows and pulls. The invention is of special importance in connection with motion resisting draft gears that employ followers at the inner and outer ends of the yokes and which are movable with respect to each other and with respect to the coupler yokes. I assemble spanners in the form of bolts with and between the followers, these bolts serving to preserve the assembly of the portion of the motion resisting mechanism that intervenes between the followers in the event of the breakage of the coupler yokes and the underlying straps that are usually disposed beneath the draft gears. In one embodiment of the invention these bolts serve to effect and maintain the assembly of the followers and the motion resisting mechanism therebetween prior to the assembly of these parts with the coupler yokes.

My invention is of particular service in effecting the assembly of motion resisting leaf springs which are provided between the followers in accordance with another feature of my invention forming the subject matter of another patent application.

I will explain my invention more fully by reference to the accompanying drawings showing the preferred embodiment thereof and in which Fig. 1 is a plan view of a draft gear embracing my invention with parts shown in section; Fig. 2 is a sectional view on line 2—2 of Fig. 1; Fig. 3 shows the draft gear of Fig. 1 illustrating the parts as they would appear when subject to pushing strain; Fig. 4 is a sectional view on line 4—4 of Fig. 1; Fig. 5 is a perspective view of one of the followers, the inner and outer followers of each gear being of similar construction; Fig. 6 is a perspective view showing one of the leaf springs that are interposed between the followers; and Fig. 7 is a perspective view illustrating a form of depresser that is interposed between two sets of such leaf springs.

Like parts are indicated by similar characters of reference throughout the different figures.

The draft gear illustrated includes a coupler stem or shank 1 and a coupler yoke 2 assembled with the stem by means of a key 3 passing through the outer end of the yoke, the coupler shank, and elongated slots 4 formed in the center or longitudinal sills 5, these slots permitting movements of the coupler longitudinally of the center sills. The yoke is supported and slides upon a plate 6 that is secured to and beneath the longitudinal sills 5. The outer follower 7 and the inner follower 8 are assembled with the yoke that surrounds them. These followers are respectively provided with lugs 9 and 10 upon their sides which are preferably those sides that are adjacent the longitudinal sills. Bolts 11 extend longitudinally of the gear and are passed through the lugs 9 and 10. These bolts are adjusted to determine the extent to which the followers may be spread apart, the adjustment being such that these followers may readily be inserted within the yoke space when they are spread apart to the maximum distance permitted by the bolts. By means of this construction the followers, together with other parts of the gearing such as those herein shown, aside from the longitudinal sill portions of the gear, may be assembled as a complete entity for location as such between the longitudinal sills.

The followers are desirably hollow and are open at their opposing ends. The main motion resisting mechanisms are disposed within the hollow followers. As illustrated, these main motion resisting mechanisms are inclusive of springs 12, 13. The supplemental motion resisting mechanism shown is inclusive of a spring plate or a set of plates 14 individual to the follower 7, a spring plate or set of spring plates 15 individual to the follower 8 and a spring plate depresser 16 interposed between the plates 14 and 15. The spring plates and the depresser extend crosswise of the gear, the spring plates preferably being long enough nearly to bridge the gap between the center sills. The spring plate depresser 16 is somewhat elliptical as it appears in plan view, this depresser serving, when the gear is subject to sufficient strain, to bend the plates toward the followers to which such plates are individual, the rims of the followers sloping away from the plates as indicated at 17 to permit the springs to be bent toward the followers.

The spring plates are of such rigidity that they will normally transfer strains between the followers of the main motion resisting mechanisms without themselves bending appreciably until the gear is subject to strains that are in excess of a predetermined degree. When the gear is subject to strains of larger degree the spring plates will yield to the bending action of the depresser and furnish an increased degree of resistance to relative movement between the followers.

The upright sides of the plates 14 and 15 are formed with recesses 18 that receive the bolts 11 that are disposed upon the outer upright sides of the gear as is understood. The depresser is formed with recesses that are in register with the recesses 18 and which similarly receive said bolts. The bolts or spanners 11 thus not only serve to maintain the followers in assembly but perform a like function for the supplemental motion resisting mechanism 14, 15, 16 and also continue to perform this function in the event of the breakage of the coupler yoke and the strap 6 in supporting relation thereto.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

A draft gear including a coupler yoke; longitudinal sills betwen which said yoke is disposed; followers assembled with the yoke; shock absorbing spring mechanism individual to each follower and interposed between the followers; spring plates extending crosswise of the gear and interposed between the shock absorbing mechanisms; a spring plate depresser interposed between the spring plates and serving, when the gear is under sufficient strain, to bend the spring plates between which the depresser is disposed, said followers having lugs; and assembling bolts spanning the space between the followers and passing through said lugs, said plates and depresser having recesses in sides thereof which receive said bolts.

In witness whereof, I hereunto subscribe my name this 20th day of December, A. D. 1921.

HERMAN C. PRIEBE.